Sept. 28, 1965   J. J. EXON   3,208,280
CONTROL APPARATUS
Filed Nov. 7, 1962
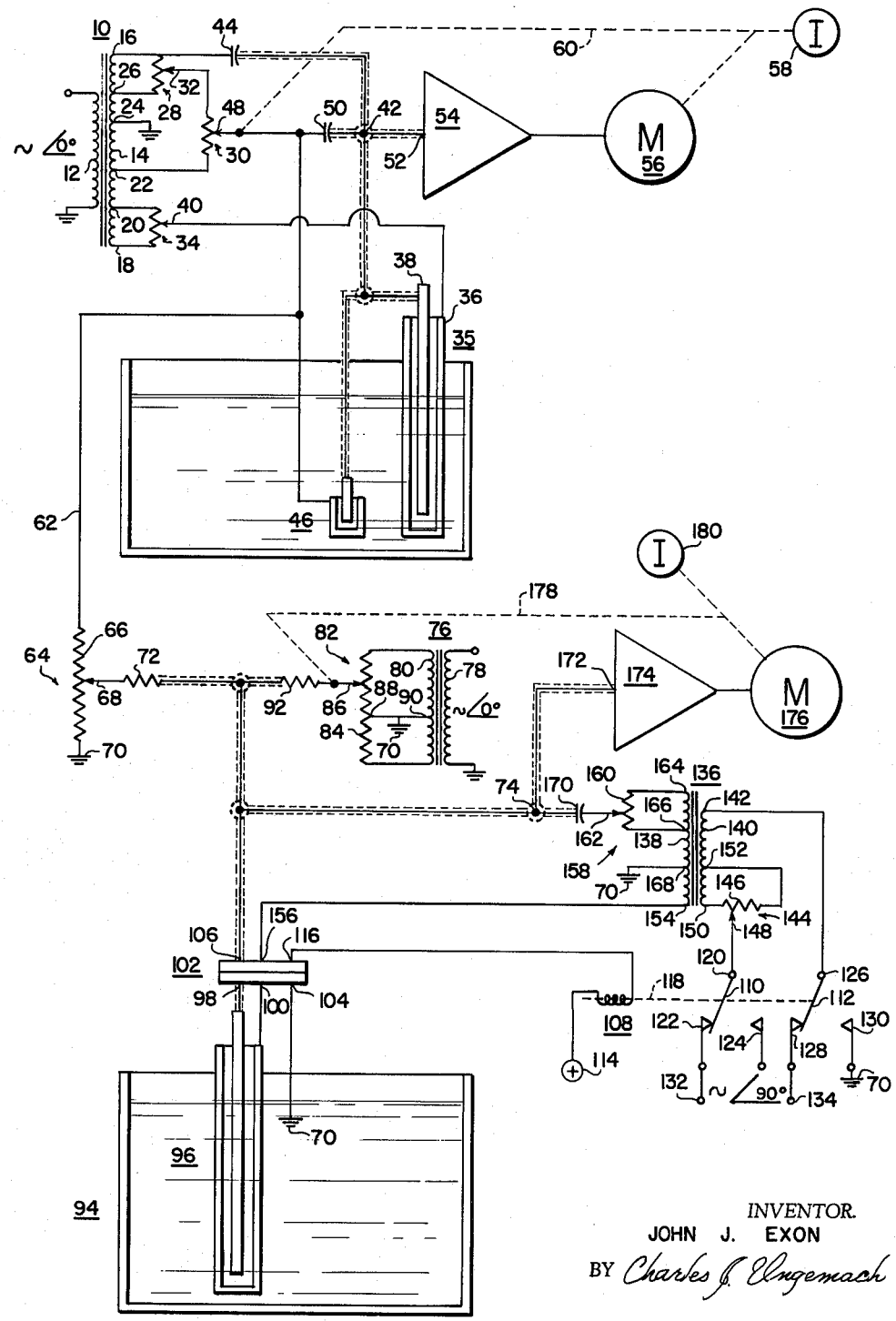
INVENTOR.
JOHN J. EXON
BY Charles J. Ungemach
ATTORNEY United States Patent Office 3,208,280
Patented Sept. 28, 1965

3,208,280
CONTROL APPARATUS
John J. Exon, Fridley, Minn., assignor to Honeywell Inc., a corporation of Delaware
Filed Nov. 7, 1962, Ser. No. 236,070
7 Claims. (Cl. 73—304)

This invention pertains generally to fuel gaging apparatus and more particularly to apparatus for providing totalizing information as to the quantity of fuel in a plurality of tanks.

In the prior art it has been necessary to have a rebalanceable bridge circuit for each tank in which the fluid quantity is being measured. This invention discloses a method for obtaining total fuel quantity indication without having a rebalance type capacitance bridge network for every tank. Each tank for which a rebalance type bridge circuit can be eliminated eliminates an amplifier, a motor, a rebalance potentiometer, and the resulting gear train between the motor and the rebalance potentiometer. The resultant circuit is therefore simpler and more reliable than the prior art totalizing systems and is particularly useful where drop tanks are involved and a tank is discarded when it is empty. However, when a two wire or open loop bridge is used instead of a rebalancing type bridge, problems arise from the fact that there is less accuracy and also from the fact that the signals obtained are not in phase with those obtained from the rebalance type indicator or the three wire bridge. This invention also overcomes this problem as well as others which arise in trying to combine the signals of rebalance type indicators and the open-loop type indicators.

Prior art such as Bancroft Patent 2,793,529 issued May 28, 1957 provides somewhat the same type system. However, Bancroft found it necessary to use an extra amplifier-motor combination along with an extra capacitor and rebalance potentiometer.

It is an object of this invention to provide totalizing indication apparatus which is simple and reliable.

Further objects and advantages will be ascertained in reading the appended claims along with the specification and the single figure which shows the circuit diagram of the totalizing apparatus.

In the figure a transformer 10 is shown having a primary winding 12 and a secondary winding 14. The secondary winding 14 has end leads 16 and 18 with intermediate taps 20, 22, 24 and 26. A resistance means or potentiometer 28 is connected between the lead 16 and the tap 26. A resistance means of a potentiometer means 30 is connected between the tap 22 and a wiper 32 of potentiometer 28. A potentiometer or resistance means 34 is connected between the tap 20 and the lead 18. A tank unit generally designated as 35 having electrodes 36 and 38 is connected between a wiper 40 of potentiometer 34 and a common summing point or junction point 42. An empty tank reference capacitor 44 is connected between the end lead 16 and the summing point 42. A dielectric compensating capacitor 46 is connected between a wiper 48 of potentiometer 30 and the summing point 42. A rebalance capacitor 50 is also connected between the wiper 48 and the junction point 42. The junction point 42 is connected to an input 52 of an amplifier or amplifying means generally designated as 54. Amplifier 54 is connected to operate a motor 56, both of which have power supplied to them by means not shown. The motor 56 operates an indicator 58 through mechanical means shown by dashed line 60. The motor 56 is also connected by dashed line 60 to wiper 48 of potentiometer 30. An output is obtained from this bridge circuit by means of a lead 62 connected between wiper 48 and one end of a potentiometer 64 having a resistance element 66 and a wiper 68. The other end of the resistance element 66 is connected to ground 70. A resistance element 72 is connected between the wiper 68 and a common summing point 74. A transformer 76 having a primary 78 and a secondary 80 has a potentiometer 82 connected between the end terminals of the secondary winding 80. The potentiometer 82 has a resistance element 84 and a wiper 86. Taps 88 and 90 on the resistance element 84 and the secondary winding 80 respectively are connected to ground 70. A signal applied to primary winding 78 of transformer 76 is in phase with a signal supplied to primary winding 12 of transformer 10. A resistance element 92 is connected between the wiper 86 and the common point 74. A fuel containing tank 94 which may be a disposable or drop type tank is shown having a capacitive probe 96 situated therein. The probe 96 is connected to terminals 98 and 100 of a separable connector generally designated 102. Another terminal 104 on connector 102 is connected to ground 70. Terminal 98 is connected through connector 102 to junction terminal 106 which is further connected to the summing point 74. A relay generally designated as 108 having movable arms 110 and 112 has a first lead connected to receive power from a positive terminal 114. The other lead of the winding on relay 108 is connected to a terminal 116 which is connected through connector 102 to terminal 104. When the tank 94 is disengaged from the rest of the system the relay is deenergized since its connection from power terminal 114 to ground 70 is broken. The relay 108 moves arms 110 and 112 by a mechanical connection 118. The arm 110 is permanently connected to a terminal 120 and is moved between contacts 122 and 124. In the energized position the arm 110 contacts contact 122. The arm 112 is permanently connected to a junction point or terminal means 126 and is moved between contacts 128 and 130. Contact 130 is connected to ground 70. The arm 112 is connected to contact 128 when relay 108 is energized. Input terminals 132 and 134 supply power to contacts 122 and 128 respectively. This signal is 90° out of phase with the signal being supplied to primary winding 12 of transformer 10. A transformer 136 has a secondary winding 138 and a primary winding 140. One end 142 of primary winding 140 is connected to the permanent contact 126. A potentiometer 144 having a resistance element 146 and a wiper 148 is connected between the other end 150 of primary winding 140 and a tap 152 on primary winding 140. The wiper 148 is connected to junction point 120. One end 154 of secondary winding 138 is connected to terminal 156 which is on connector 102 and is connected through connector 102 to terminal 100. A potentiometer generally designated as 158 has a resistance element 160 and a wiper 162. The resistance element 160 is connected between the other end 164 of secondary winding 138 and a tap 166 on secondary winding 138. A tap 168 on secondary winding 138 is connected to ground 70. An empty tank reference capacitor 170 is connected between the wiper 162 and the summing point 74. The summing point 74 is also connected to an input 172 of an amplifier or amplifying means generally designated as 174. Amplifier 174 has an output connected to drive a motor generally designated as 176. Power is supplied to amplifier 174 and motor 176 by means not shown. The motor 176 has a mechanical connection 178 which operates an indicator 180 and moves the wiper 86 of potentiometer 82.

The operation of the rebalanceable bridge circuit which utilizes transformer 10 and amplifier 54 is shown and described in a Franzel et al. Patent 3,037,385, issued June 5, 1962 and assigned to the same assignee as the present invention. A brief summary of the operation of this bridge circuit will be given but further details may be obtained from the Franzel et al. patent. The capacitance of capacitive element 44 times the voltage appearing at lead 16 provides a numeral result which is equal to the capacitance of the tank unit 35 times the voltage appearing at wiper 40 of potentiometer 34 when there is no fluid between the electrodes. As fluid rises between the electrodes 36 and 38 the capacitance increases. It can thus be determined that no resultant signal is obtained when the tank is empty since the capacitor 44 is on one end of the secondary winding 14 while the tank capacitor is on the other end. As the fluid rises a signal is obtained due to the increasing capacitance of the tank unit 35, which signal is indicative of the height of fluid between electrodes 36 and 38. As thus far described this is what is commonly called a two wire bridge and is basically what is used in the bridge circuit shown on the lower portion of the drawing which utilizes tank unit 96 and capacitor 170. The rebalanceable bridge circuit however additionally has a dielectric compensating capacitor 46 which provides compensation for changes in dielectric of the fluid between electrodes 36 and 38. An indication of fluid level is obtained on the indicator 58 since the signal appearing at junction point 42 is applied to amplifier 54 which operates motor 56 to operate both the indicator 58 and the wiper 48 of potentiometer 30 as to reduce the signal appearing at common point 42 to a minimum. It can thus be seen that the signal appearing at wiper 48 is indicative of fluid level. As briefly mentioned above, the bridge circuit using tank unit 96 has a capacitor 170 which is equal to the empty tank capacitance of probe 96 and the output signal appearing at common point 74 is indicative of fluid level between the electrodes or probe 96. This signal is not compensated for changes in dielectric of the fluid being measured.

The signal obtained from the rebalanceable bridge circuit is obtained directly from wiper 48 and as a result is not phase shifted by any capacitive unit before it is applied to input 172 of amplifier 174. The signal obtained from transformer 136 is applied through either capacitor 170 or capacitive unit 96 before being directly applied to junction point 74. This means that the signal from the two wire bridge circuit is phase shifted 90° by these capacitive elements. In order to sum this signal with the signal obtained from the rebalanceable bridge circuit, the input to transformer 136 is phase shifted 90° as is shown in the drawing. The input signal being shifted 90° and the signal being shifted another 90° through the capacitive element means that the signals from the two bridge circuits will be in phase and additive as applied to the amplifier 174. A signal is also obtained from potentiometer 82 and applied to amplifier 174. Any resultant signal which is applied to amplifier 174 operates motor 176 to move the indicator 180 and the wiper 86 of potentiometer 82 to reduce the input signal to amplifier 174 to a minimum. In this manner indicator 180 provides an indication of total fuel quantity in the system.

The present invention is preferably applied to providing total fluid quantity information where the tank or tanks which are gaged by the two wire bridges are emptied first. Since high accuracy is not required until the total quantity of fluid is quite low in many instances, the extreme accuracy which is obtained by using a rebalanceable bridge circuit with dielectric constant compensation for each tank is not normally required.

This invention is particularly adaptable for use in circuits where the tank 96 is a drop tank on an airplane and will be discarded as soon as the tank is empty. Normally, if the tank 94 were discarded along with capacitive element 96, a signal would still be applied through capacitor 170 to produce an error in the totalizing information. For this reason the relay 108 is connected to ground 70 through the connector 102 so that the transformer 136 is deenergized when the tank 94 is dropped. One lead 142 of transformer 136 is connected to ground 70 through control 130 when the relay 108 is deenergized to prevent spurious signals from being supplied to the unenergized transformer 136. This ground connection will not be necessary in all types of systems.

It is to be realized however that this system is not limited to fuel systems wherein the tanks are dropped but may be used in any fluid quantity measuring systems wherein it is known that one or more tanks will be among the first emptied and high accuracy is not required until the total fluid quantity is low compared with the total amount of fuel which the system is required to indicate.

It is to be understood that the form of the invention herein shown and described is to be taken as a preferred embodiment. Also it is to be understood that in describing the preferred embodiment of the invention which is illustrated in the drawing, specific terminology was resorted to for the sake of clarity. However, it is not intended to be limited to the specific terms so selected and it is to be understood that each specific term includes all technical equivalents which operate in a similar manner to accompilsh a similar purpose. It is therefore to be understood that I wish to be limited not by the terminology and the specific structure described in the specification but only by the scope of the appended claims.

I claim:
1. In apparatus for providing totalizing information as to the quantity of fuel in a plurality of fuel tanks one of which is a disposable drop tank comprising, in combination:

rebalanceable bridge network means for providing an indication of the quantity of fuel in a permanent tank, said network means including output means connected to a rebalance potentiometer wiper in said bridge network means;

transformer means including primary winding means and secondary winding means;

means connected to said primary winding for supplying a first signal thereto;

tank unit capacitive gaging means including first and second terminal means, said tank unit means being inserted in said drop tank and said first terminal means being connected to one end of said secondary winding means and said second terminal means being connected to a summing point;

capacitive means having a first lead connected to the other end of said secondary winding means and having a second lead connected to said summing point;

variable means connected to said summing point for supplying a variable amplitude signal thereto which is in-phase with the signal being received from said capacitive means connected to said other end of said secondary winding means;

amplifying means including input and output means, said input means being connected to said summing point and to said output means of said rebalanceable bridge network means for receiving signals therefrom and said output means being connected for controlling the amplitude of the signal supplied by said variable means to give a minimum amplitude resultant signal at said input means of said amplifying means;

indicator means connected to said output means of said amplifying means for providing an indication of the total quantity of fuel in the tanks; and means for removing said first signal from said primary winding when said disposable tank is dropped, the rest of the totalizing apparatus remaining operative in the absence of said first signal.

2. In fuel quantity totalizer apparatus comprising in combination:

first signal supplying means for supplying a first signal of a first phase which varies in amplitude as a function of fuel quantity in a first tank of fuel;

second signal supplying means for supplying a second signal of a second phase and of a constant amplitude;

third signal supplying means for supplying a variable amplitude third signal of a third phase;

fourth signal supplying means for supplying a variable amplitude fourth signal of said second phase, said fourth signal varying in amplitude in accordance with the amplitude of said third signal and as a function of the dielectric properties of the fuel;

first amplifying means including input and output means, said input means being connected for receiving signals from said first, second, third and fourth signal supplying means and said output means being connected for varying the amplitude of said third signal supplying means to provide a minimum resultant signal at said input means of said amplifying means;

indicator means connected to said output means of said first amplifying means for providing an indication of fuel level in said first tank of fuel;

fifth signal supplying means for supplying a fifth signal of said third phase which varies in amplitude as a function of fuel quantity in a second tank of fuel;

sixth signal supplying means for supplying a constant amplitude sixth signal of a fourth phase;

seventh signal supplying means for supplying a variable amplitude signal of said fourth phase;

second amplifying means including input and output means, said input means of said second amplifying means being connected for receiving said third, fifth, sixth and seventh signals, and said output means being connected to said seventh signal supplying means for varying the amplitude of said seventh signal to provide a minimum resultant signal at said input means of said second amplifying means; and indicator means connected to said output means of said second amplifying means for providing an indication of total fuel quantity in said first and second tanks of fuel.

3. In totalizing apparatus for providing an indication of the total amount of fuel in a plurality of fuel tanks comprising, in combination:

rebalanceable capacitive bridge network fuel gaging apparatus including output means for providing an electrical output signal indicative of fuel quantity in one of said fuel tanks;

constant amplitude first signal source means for providing a first signal of a first phase, said first signal source including a first capacitor means having a fixed value of capacitance;

variable amplitude second signal source means for providing a second signal of a phase opposite said first phase, said second signal source means including a capacitive sensing means inserted in another of said fuel tanks, said capacitive sensing means varying in capacitance as a function of fuel quantity;

variable amplitude third signal source means of said first phase for providing a third signal, the amplitude of which can be varied by mechanical means;

indicator means; and summing amplifier means including input and output means, said input means of said amplifier means being connected to receive said signals from said output means of said bridge network apparatus, and from said first, second, and third signal source means, said output means of said amplifier means being connected to said indicator means for providing totalizing indications of the quantity of fuel in said tanks and said output means of said amplifier means being connected to said third signal source means for varying the amplitude of said third signal until the sum of said first and third signals are substantially equal to the sum of said output signal from said bridge network means and said second signal.

4. In apparatus for providing totalizing information as to the quantity of fuel in a plurality of fuel tanks comprising, in combination:

rebalanceable bridge network means for providing an indication of the quantity of fuel in a first of said tanks, said network means including output means connected for receiving a first signal from a potentiometer wiper in said bridge network means;

two wire bridge network means for providing a direct output second signal which is in-phase with said first signal appearing at said output means of said rebalanceable bridge network means, the direct output second signal being indicative of fuel quantity in a second of said tanks, the second tank being emptied before the first tank to provide the greatest accuracy; and rebalance means connected to receive said first and second signals, said rebalance means being adapted for providing an indication of total fuel in said tanks.

5. In apparatus for providing totalizing information as to the quantity of fluid in a plurality of tanks comprising, in combination:

rebalanceable bridge network means for providing an indication of the quantity of fluid in one of said tanks, said network means including output means connected for receiving a signal indicative of any signal obtained from a rebalance potentiometer wiper in said bridge network means;

two wire bridge network means for providing a direct ouput signal which is in-phase with the signal appearing at said output means of said rebalanceable bridge network means, the direct output signal being indicative of fluid quantity in another of said tanks; and rebalance means connected to receive said signals from said rebalanceable bridge network means and from said two wire bridge network means, said rebalance means being adapted for providing an indication of total fluid in said tanks.

6. In a totalizing system for providing indications of total fluid in at least two tanks, a first of said tanks being normally emptied before a second of said tanks comprising, in combination:

open-loop capacitive bridge network means for providing a direct output signal indicative of fluid quantity in said first tank;

closed-loop capacitive bridge network means for providing an individual indication of fluid quantity in said second tank, said closed loop capacitive bridge network means including output means connected to the rebalancing portion of said closed-loop network means; and rebalance means connected for receiving output signals from said capacitive bridge networks and adapted for providing an indication of total fluid quantity in said tanks.

7. In a totalizing system comprising, in combination:

open-loop capacitive bridge network means for providing a direct output signal indicative of fluid quantity in a first tank;

rebalanceable capacitive bridge network means for providing an individual indication of fluid quantity in a second tank, said rebalanceable capacitive bridge network means including output means connected to a rebalancing portion of said rebalanceable network means; and rebalance means connected for receiving output signals from said capacitive bridge networks and adapted for providing an indication of total fluid quantity in said tanks.

References Cited by the Examiner
UNITED STATES PATENTS

| | | | |
|---|---|---|---|
| 2,793,529 | 5/57 | Bancroft | 73—304 |
| 3,100,347 | 8/63 | Fritze | 73—304 |
| 3,111,845 | 11/63 | Prigozy | 73—304 |

ISAAC LISANN, *Primary Examiner.*